March 24, 1970     L. L. JASPER     3,503,017
STROBE PULSE GENERATOR
Original Filed July 1, 1966
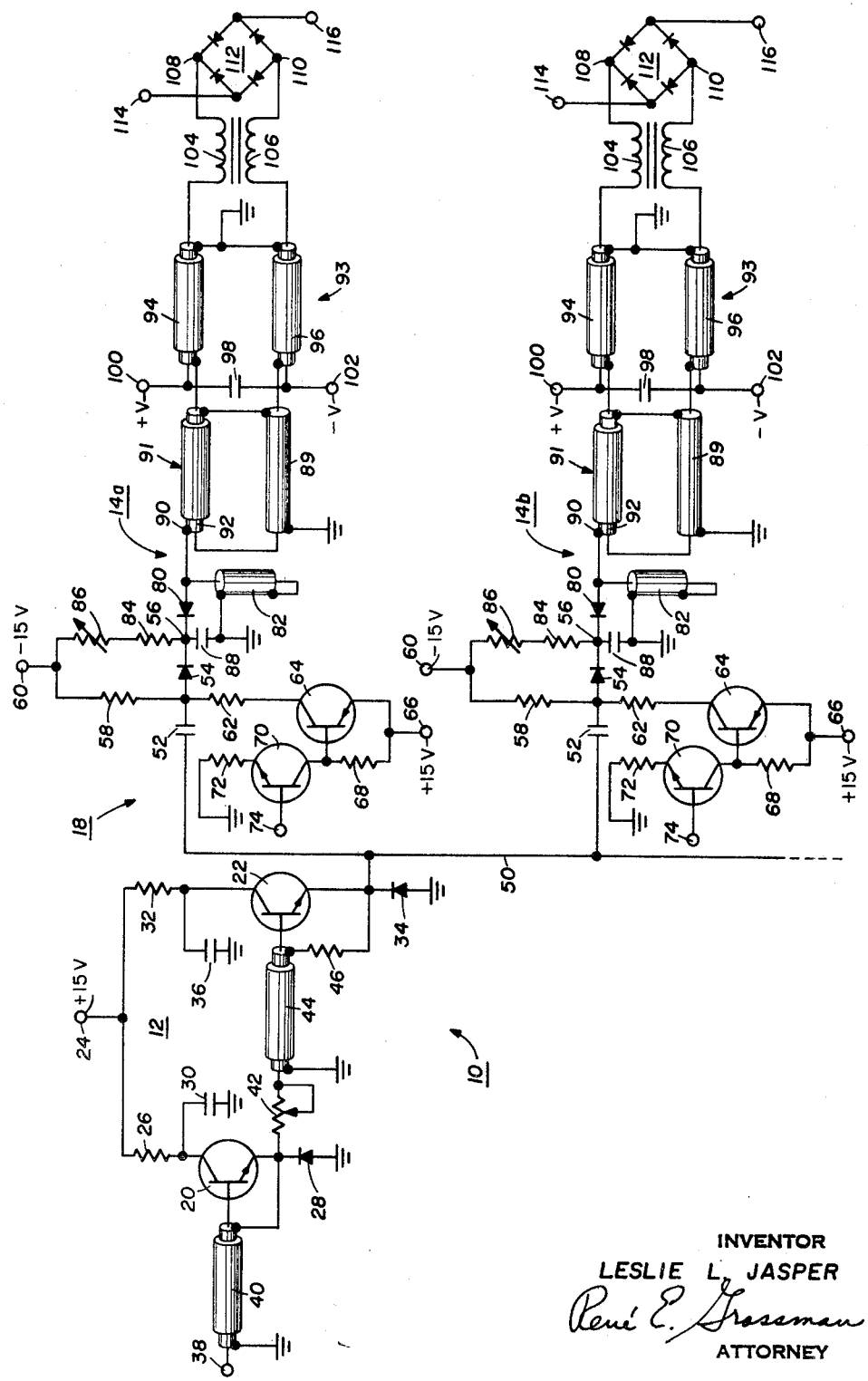
INVENTOR
LESLIE L. JASPER
ATTORNEY

United States Patent Office 3,503,017
Patented Mar. 24, 1970

3,503,017
STROBE PULSE GENERATOR
Leslie L. Jasper, Houston, Tex., assignor to Texas Instruments Incorporated, Dallas, Tex., a corporation of Delaware
Original application July 1, 1966, Ser. No. 562,190, now Patent No. 3,459,969, dated Aug. 5, 1969. Divided and this application Feb. 6, 1969, Ser. No. 816,445
Int. Cl. H03h 7/00; H03k 5/00
U.S. Cl. 333—24
3 Claims

ABSTRACT OF THE DISCLOSURE

A system including a plurality of voltage sampling diode bridges each having separate D.C. inputs for normally reverse biasing the diodes of each of the bridges "off." A separate pulse generator is coupled to each bridge by a separate transformer. Equal and opposite pulses are applied to the respective D.C. inputs of the bridges to forward bias the diodes "on" whenever the respective pulse generator is enabled by a logic level. Another pulse generator is coupled to all of the logically controlled pulse generators to operate the pulse generator that is logically enabled in synchronism with a timing pulse.

---

This application is a division of application Ser. No. 562,190 filed July 1, 1966, now Patent No. 3,459,969, issued Aug. 5, 1969.

This invention relates generally to pulse generation, and more particularly relates to a system and subcombination thereof for producing equal and opposite spike-shaped pulses.

There are a number of different applications for a pair of pulses having equal and opposite amplitudes and shapes. One particularly important application for such pulses is in the operation of voltage sampling probes which utilize a rectifier bridge switch. Such a bridge switch has an input point, an output point, and a pair of reverse bias points. In order to open the switch, potentials are applied to the reverse bias points of sufficient magnitude to insure that the diodes remain reverse biased under all input and output conditions. For most sampling operations, it is desired to momentarily close the bridge switch so as to transfer a portion of the voltage present at the input at a precise point in time to the output. This is accomplished by applying equal and opposite pulses to the reverse bias points of such an amplitude and polarity as to momentarily forward bias all of the diodes of the bridge switch. As a result, a portion of the difference between the voltage at the input and the voltage at the output of the bridge switch is transferred to the output of the bridge switch.

The sampling resolution and accuracy of the bridge switch is highly dependent upon how narrow the pulses are and the extent to which the pulses are precisely equal and opposite. Thus, in order to have high resolution, it is important to have very short duration pulses.

In fully automated test systems such as that described in U.S. application Ser. No. 512,109, entitled "Universal Electronic Test System," filed by Alford et al. on Dec. 7, 1965, and assigned to the assignee of the present invention, a plurality of different voltage sensing probes each using a diode bridge switch are multiplexed so that successive measurements can be made on a plurality of different leads of a multilead component under test using the same measuring channel. The several sampling probes are often operated in rapid sequence during a series of tests and each sampling bridge must sample the waveform precisely at the same point in time with respect to a timing pulse in order to make accurate measurements.

An important object of this invention is to provide a system for generating equal and opposite voltage pulses.

Another very important object of the invention is to provide a system for selectively producing a pair of equal and opposite pulses on any one of a plurality of channels for selectively operating any one of a plurality of diode bridge switches.

A further object is to provide such a system wherein each of a plurality of pulse producing channels is normally fully energized and therefore in a stable condition ready for immediate operation.

A further object is to provide such a system wherein a relatively low speed driver pulse is switched between channels rather than switching each of a plurality of channels producing a high speed pulse.

Another object is to provide a means for combining reverse biasing potentials with the equal and opposite pulses without disturbing the balance between the pulses.

Another object of the invention is to provide a pulse generator for producing a relatively high voltage and high current pulse which generates the minimum amount of noise in the remainder of the system as a result of electromagnetic radiation.

Yet another object is to provide a pulse generator for producing a high voltage, high current pulse having a fast rise time suitable for driving a snap-off diode from a low voltage, low current timing pulse.

These and other objects are accomplished in accordance with the present invention by means of a plurality of first pulse generator means for producing equal and opposite pulses at the respective outputs thereof in response to a transition applied to the respective inputs thereof, a second pulse generator means for producing said transition at the output thereof in response to a timing pulse, and logic controllable switching means interconnecting the output of the second pulse generator means and the inputs of each of the first pulse generator means for selectively applying said transition to any one of the inputs of the first pulse generator means.

In accordance with a more specific aspect of the invention, each of the first pulse generator means comprises a forward biased snap-off diode connected in series with a transmission line stub transformer and an adjustable current source. A capacitor is connected between the cathode of the snap-off diode and ground, and the transition is applied to the cathode of the diode to reverse bias the diode. A transformer means is connected to the anode of the snap-off diode for producing equal and opposite pulses in response to the snap-off transition at the anode of the snap-off diode.

In accordance with another aspect of the invention, the controllable switching means comprises a capacitor and a switching diode connected in series between the output of the second pulse generator means and the input of each of the first generator means. Each of the switching diodes is connected to be forward biased by the transition at the output of the second pulse generator means. Biasing means is provided for selectively reverse biasing each of the switching diodes to a level greater than the amplitude of the transition so that the transition will not propagate through the switching diode to the snap-off diode when the switching diode is reverse biased.

In accordance with a still more specific aspect of the invention, the second pulse generator means comprises first and second transistors each of which is connected in a series circuit from a collector supply voltage to an emitter supply voltage comprised of a resistance, the collecter-emitter of the transistor, and a reverse biased diode. A capacitor is connected between the collector of each transistor and the emitter supply voltage. The first transistor is turned on by common mode input means connected to apply a voltage pulse to forward bias the base-emitter junction of the first transistor so as to cause the transistor to conduct and the emitter of the transistor to approach the voltage stored on the capacitor connected between the collector of the transistor and the emitter supply voltage. The voltage swing of the emitter of the first transistor is then applied by a second common mode means to forward bias the base-emitter junction of the second transistor and thereby turn the second transistor on at a rapid rate to product a sharp rising, high current pulse. The sharp rising, high current pulse is then applied through the switching means to reverse bias the selected snap-off diode.

The novel features believed characteristics of this invention are set forth in the appended claims. The invention itself, however, as well as other objetcs and advantages thereof, may best be understood by reference to the following detailed description of an illustrative embodiment, when read in conjuction with the accompanying drawing, wherein:

The figure is a schematic circuit diagram of a circuit constructed in accordance with the present invention.

Referring now to the drawing, a system constructed in accordance with this invention is indicated generally by the reference numeral 10. The system 10 is comprised generally of a power pulse generator indicated generally by the reference numeral 12, a plurality of secondary pulse generators, only two of which are illustrated and indicated generally by the reference numerals 14a and 14b, and a multiplex switching means indicated generally by the reference numeral 18, which is used to selectively connect the output of the pulse generator 12 to the input of one of the plurality of generators 14a and 14b.

The pulse generator 12 has input and output transistors 20 and 22. The input transistor 20 is connected in a series circuit comprised of the collector supply voltage terminal 24, which in one embodiment is +15.0 v., resistor 26, the collector-emitter of transistor 20, and normally reverse biased diode 28. A capacitor 30 is connected between the collector of transistor 20 and ground, which is the collector supply voltage. Similarly, the output transistor 22 is connected in a series circuit comprised of the supply voltage terminal 24, resistor 32, the collector-emitter of transistor 22, and normally reverse biased diode 34. A capacitor 36 is connected between the collector of transistor 22 and ground. An input terminal 38 of the pulse generator is connected by the conductor of a ferrite cored length of coaxial cable 40 to the base of input transistor 20. The end of the shield of the cable 40 near the input 38 is grounded, and the end of the shield adjacent the base of transistor 20 is connected to the emitter of the transistor to provide a common mode means for forward biasing the base-emitter junction of the transistor 20 and maintaining conduction of the transistor even though the emitter of transistor 20 raises to a high positive value. The emitter of transistor 20 is connected through a variable resistor 42 and a second length of ferrite cored coaxial cable 44 to the base of transistor 22. The input end of the shield of the coaxial cable 44 is grounded, and the output end is connected through a small resistor 46 to the emitter of transistor 22. The emitter of transistor 22 is considered the output of the pulse generator 12.

The output of the pulse generator 12 is connected to a bus 50 which in turn is connected by a capacitor 52 and switching diode 54 to the input 56 of each of the pulse generators 14a and 14b. The switching diode 54 is biased by a voltage divider network including a resistor 58 which interconnects a negative voltage supply terminal 60 and the anode of switching diode 54 and resistor 62 and the collector-emitter circuit of transistor 64 which interconnect a positive voltage supply terminal 66 and the anode of switching diode 54. The base of transistor 64 is biased by a voltage divided including resistor 68 and transistor 70 and resistor 72 which is connected between the supply voltage terminal 66 and ground. The base terminal 74 of the transistor 70 is the logic input for controlling the respective switching diodes 54 as will hereafter be described in greater detail.

Each of the pulse generators 14a is comprised of a snap-off diode 80 which is normally forward biased through a series circuit from ground through first the shield and then the conductor of a shorted stub transformer 82, the diode 80, fixed resistor 84 and variable resistor 86 to the negative voltage supply terminal 60. A capacitor 88 is connected between the cathode of the diode 80 and ground. The anode of the diode 80 is connected to the input 90 of a first Balun transformer 91. The Balun transformer 91 is comprised of a first length of coaxial transmission line 92 having a ferrite core and a second matched length of coaxial transmission line 89. The input 90 is the input end of the shield of the coaxial transmission line 92. The conductor of the transmission line 92 is common with the conductor of the transmission line 89. The input end of the shield of the transmission line 89 is connected to ground, and the output ends of the shields of both transmission lines 92 and 89 are common and connected to ground.

A second Balun transformer indicated generally by the reference numeral 93 is comprised of a first length of ferrite cored coaxial transmission line 94 and a second length of ferrite cored coaxial transmission line 96. The to outputs of the Balun transformer 91 are connected to the input ends of the shields of the transmission lines 94 and 96. The outer ends of the shields are connected to ground. The input ends of the conductors of the transmission lines 94 and 96 are interconnected by a capacitor 98, and are connected to reverse bias supply terminals 100 and 102. The output ends of the conductors are connected to the windings 104 and 106 of an isolation transformer and finally to reverse bias inputs 108 and 110 of a rectifier bridge switch indicated generally by the reference numeral 112. The rectifier bridge switch 112 is comprised of four diodes connected as illustrated and has an input 114 and an output 116.

OPERATION

Assume that all power supplies are active and that transistors 20 and 22 are turned off so that capacitors 30 and 36 will each be charged to approximately +15.0 v. The snap-off diodes 80 will be forward biased to a level sufficient for the diodes to operate in the snap-off mode, and the capacitors 88 will be charged to a voltage equal to the forward voltage drop across the respective diodes 80. Reverse bias potentials will be applied at the reverse bias supply terminals 100 and 102 so as to reverse bias all of the diodes of the rectifier bridge switches 112. Only one of the control terminals 74 is at a logic "1" level of +4.0 v., and the remaining terminals 74 are at a logic "0" level of ground potential. For purposes of this description, assume that control input 74 associated with the pulse generator 14a is at a logic "1" level of +4.0 v., and that all other control inputs 74 are at a logic "0" level.

When a positive timing pulse having an amplitude of +1.0 v. and a width of 10 nanoseconds is applied to input 38, the pulse is passed through the transformer 40 and applied from base to emitter of the transistor 20, thus forward biasing the base-emitter junction and turning the transistor 20 on. The purpose of the transformer 40 is to provide a common mode connection so that the base-emitter junction can continue to be forward biased by +1.0 v. even though the emitter of the transistor 20 almost immediately approaches the voltage across the capacitor 30, which is approximately +15.0 v. This provides a +15.0 v. pulse at the output of the first stage, i.e., the emitter of transistor 20, from a +1.0 v. input pulse. The diode 28 is provided to clamp off the reverse swing from the transformer 40 in order to prevent damage to the transistor 20. The +15.0 v. swing of the emitter of the transistor 20 is passed through the variable resistor 42 and transformer 44, which also provides common mode operation, and is applied to forward bias the base-emitter junction of transistor 22. The resistor 42 is made variable in order to adjust the current to the base of transistor 22. The resistor 46 is provided to prevent accidentally overdriving the transistor 22, should the resistor 42 be adjusted to a very low value. The +15.0 v. pulse produced by the swing of the emitter of transistor 20 provides sufficient current to rapidly drive transistor 22 into saturation, thus producing a high current pulse having a fast rise time which is applied to the output bus 50. The diode 34 again prevents damage to the transistor 22 during the reverse swing of the transformer 44.

It will be recalled that it was assumed that the logic control input 74 for the pulse generator 14a was at a logic "1" level of +4.0 v. Thus transistor 70 is turned on which in turn turns transistor 64 on. Since resistors 62 and 58 are substantially equal, the anode of switching diode 54 is approximately at ground potential. The positive pulse of current applied to the bus 50 can then pass through the capacitor 52 and through the forward biased switching diode 54 to charge the capacitor 88 and reverse bias the snap-off diode 80 as will presently be described. However, since the input 74 associated with the other pulse generators 14b, etc., are at a logic "0" level of ground potential, the transistors 70 and 64 of the other channels are turned off and the anode of the switching diode 54 is at approximately −15.0 v. Therefore, when the +15.0 v. pulse is applied to the capacitors 52 of the channels 14b, etc., the anode of the corresponding switching diode 54 is not made sufficiently positive to cause the diode to conduct and no positive pulse is applied to reverse bias the respective snap-off diode 80.

As previously mentioned, the snap-off diode 80 is continually forward biased through the series circuit extending from ground through the shield and then the conductor of the shorted stub coaxial transformer 82, the diode 80, and resistors 84 and 86 to the negative voltage supply terminal 60. Thus the forward biased current through the diode 80 is constant whether the particular pulse generator 14 is connected or disconnected from the pulse generator 12 by the switching means 18. As mentioned, the forward voltage drop through the snap-off diode 80 is impressed across the capacitor 88. When the positive pulse from the generator 12 passes through the diode 54 and hits the snap-off diode 80 and capacitor 88, the diode 80 momentarily conducts in the reverse direction as all carriers are swept from the junction, the stops conducting very abruptly. The capacitor 88 prevents the reverse current from changing in the stub transformer 82 at a rate which would produce an undesirable voltage change. This abrupt cessation in the current through the stub transformer 82 generates a negative pulse which is applied to input 90 of the Balun transformer 91. The point at which the pulse occurs with respect to the incoming positive pulse and therefore with respect to the timing pulse applied to input 38, is determined by the setting of adjustable resistor 86, and the width of the negative pulse is twice the time length of the coaxial stub transformer 82.

The negative pulse is applied to the input 90 of the first Balun transformer 91 which produces equal and opposite pulses in the conductors of the coaxial cables 92 and 89, the pulse on the conductor of cable 92 being positive and that from cable 89 being negative. The positive and negative pulses are then applied to the shields of coaxial cables 94 and 96, respectively, of the second Balun transformer 93. The positive pulse applied to the shield of cable 94 produces a negative pulse in the conductor of the coaxial line 94, and the negative pulse applied to the shield of coaxial line 96 produces a positive pulse in the conductor. A positive bias voltage is applied to terminal 100 and a substantially equal negative bias voltage is applied to the terminal 102. These D.C. bias voltages are fed through the conductors of the cables 94 and 96 and the windings 104 and 106 to the reverse bias points 108 and 110. It is important to note that the conductors of coaxial cables 94 and 96 which carry the D.C. bias to the bias points 108 and 110 of the diode bridge 112 are electrically isolated from the conductors of coaxial cables 92 and 89 except by inductive coupling, and are isolated from one another by the capacitor 98. The combination of the two transformer stages and the capacitor 98 permits the introduction of the reverse bias potential at a neutral point resulting in a minimum disturbance of the balanced pulses. The negative pulse induced in the conductor of coaxial cable 94 and the positive pulse induced in the conductor of coaxial cable 96 then propagate through the windings 104 and 106 of the isolation transformer and overcome the reverse D.C. bias applied to reverse bias points 108 and 110 so as to momentarily forward bias the diodes of the bridge switch 112. During the period of time that the diodes are forward biased, a portion of the algebraic difference between the voltage at the input 114 and the voltage at the output 116, the portion depending upon the sampling efficiency of the bridge switch, will be transferred from the input to the output in a manner known in the art.

From the above detailed description of a preferred embodiment of the invention, it will be noted that a relatively slow speed pulse is generated by the pulse generator 12 and this pulse is multiplexed by the switching means 18 as opposed to the multiplexing of the high frequency pulses produced by the several pulse generation channels 14. It will also be noted that each of the snap-off diodes 80 is always conducting current in the forward direction and therefore is continually maintained at a substantially constant operating temperature regardless of the duty cycle of the particular channel. This minimizes variations in the amplitudes of the pulses and variations in the time at which the pulses are produced as a result of imbalanced and changing duty cycles among the various channels. Further, since the transistors of the pulse generator 12 operate in the saturation mode, rather than the avalanche mode as is often the case in pulse generators having a high current requirement, the noise generated in the adjacent system due to radiant energy is substantially reduced. Yet the pulse generator 12 produces a pulse having a sufficiently fast rise time that the reverse current through the snap-off diode 80 substantially stabilizes before the diode abruptly stops conducting. As a result, the amplitude and timing of the equal and opposite pulses generated remain substantially constant.

Although a preferred embodiment of the invention has been described in detail, it is to be understood that various changes, substitutions and alterations can be made therein without departing from the spirit and scope of the invention as defined by the appended claims.

What is claimed is:

1. In a system for producing equal and opposite pulses superimposed upon biasing potentials, the combination of a pair of transmission lines each having a conductor and a shield each of which has an input and an output end, a capacitor interconnecting the input ends of the conductor, means grounding the output ends of the shields, the input ends of the shields being the inputs for equal and opposite pulses, the input ends of the conductors being the inputs for the biasing potentials, and the output ends of the conductors being the output for the combined pulses and biasing potentials.

2. The combination defined in claim 1 further characterized by second circuit means connected to the input ends of shields for producing substantially equal and opposite pulses at the respective input ends from a single timing pulse applied to the input thereof and third circuit means connected to the input of the second circuit means for applying a timing pulse.

3. The combination defined in claim 2 further characterized by a transformer comprised of a third and fourth transmission line each having a conductor and a shield each of which has an input end and an output end, the input end of one shield being the input of the transformer, the input end of the other shield being grounded, the output ends of the shields being grounded, the input ends of the conductors being interconnected, and the output ends of the conductors being connected to the input ends of the shields of said pair of transmission lines.

References Cited

UNITED STATES PATENTS 2,149,387   3/1939   Brown _____ 333—84

HERMAN KARL SAALBACH, Primary Examiner

MARVIN NUSSBAUM, Assistant Examiner

U.S. Cl. X.R.

333—1, 97